United States Patent
Steinich et al.

(10) Patent No.: US 8,042,277 B2
(45) Date of Patent: Oct. 25, 2011

(54) ANGLE SENSOR CIRCUIT

(75) Inventors: Klaus Manfred Steinich, Zorneding (DE); Peter Wirth, Eching (DE)

(73) Assignee: ASM Automation Sensorik Messtechnik GmbH, Moosinning (DE)

( * ) Notice: Subject to any disclaimer, the term of this patent is extended or adjusted under 35 U.S.C. 154(b) by 227 days.

(21) Appl. No.: 12/319,973

(22) Filed: Jan. 14, 2009

(65) Prior Publication Data
US 2009/0188120 A1 Jul. 30, 2009

(30) Foreign Application Priority Data

Jan. 15, 2008 (DE) .......... 10 2008 004 454

(51) Int. Cl.
*G01B 7/30* (2006.01)
*G01R 1/30* (2006.01)

(52) U.S. Cl. .................. 33/1 PT; 33/366.11

(58) Field of Classification Search ............ 33/1 P, 33/735, 736, 1 PT, 366.11, 706–708
See application file for complete search history.

(56) References Cited

U.S. PATENT DOCUMENTS

| | | | |
|---|---|---|---|
| 4,631,540 A * | 12/1986 | Feldman | 33/1 PT |
| 4,829,247 A * | 5/1989 | Wallrafen | 324/207.12 |
| 4,991,301 A * | 2/1991 | Hore | 33/366.25 |
| 5,180,986 A * | 1/1993 | Swartz et al. | 33/366.12 |
| 5,399,981 A * | 3/1995 | Vermesse | 33/1 PT |
| 5,444,369 A | 8/1995 | Luetzow | |
| 5,446,966 A * | 9/1995 | Ishizaki | 33/1 PT |
| 5,528,139 A | 6/1996 | Oudet et al. | |
| 6,002,338 A * | 12/1999 | Pavlov et al. | 340/635 |
| 6,043,645 A | 3/2000 | Oudet et al. | |
| 6,252,395 B1 * | 6/2001 | Aoyama et al. | 324/207.12 |
| 6,848,187 B2 * | 2/2005 | Ito et al. | 33/1 PT |
| 6,912,791 B2 * | 7/2005 | Tateishi et al. | 33/1 PT |
| 6,973,731 B2 * | 12/2005 | Aikawa et al. | 33/1 PT |
| 7,036,233 B1 * | 5/2006 | Schindler | 33/1 PT |
| 7,055,255 B2 * | 6/2006 | Diaz | 33/366.24 |
| 7,323,865 B2 | 1/2008 | Teulings et al. | |
| 7,714,570 B2 * | 5/2010 | Thomas et al. | 324/207.2 |
| 2009/0235727 A1 * | 9/2009 | Weiberle et al. | 33/1 PT |
| 2010/0156397 A1 * | 6/2010 | Yabusaki et al. | 324/207.2 |
| 2010/0181997 A1 * | 7/2010 | Thomas et al. | 324/207.25 |

FOREIGN PATENT DOCUMENTS

| | | |
|---|---|---|
| DE | 694 09 995 T3 | 2/1994 |
| DE | 695 02 512 T2 | 1/1995 |
| DE | 10 2004 044 009 | 7/2005 |

* cited by examiner

*Primary Examiner* — Yaritza Guadalupe-McCall
(74) *Attorney, Agent, or Firm* — Head, Johnson & Kachigian, P.C.

(57) ABSTRACT

An analog electronic angle sensor circuit with a ground connection (GND) and with a supply voltage connection (+UB) and with an output (OUT), comprising an actual sensor (12) and a suitable wiring of said sensor (12), wherein the voltage at the output (OUT) relative to ground is proportional to the product of the supply voltage (+UB) and the measured angle (φ) and a method for electronic emulation of an optimum potentiometer wherein the input voltage (+UB) is reduced to a fixed fraction (1/k) and an analog angle sensor (12) is operated with this fraction of the input voltage (+UB) as an operating voltage ($U_v$), wherein the output voltage (OUT1) of said angle sensor is proportional to the operating voltage and to the rotation angle (φ) measured by said angle sensor (12).

16 Claims, 2 Drawing Sheets

ANGLE SENSOR CIRCUIT

CROSS REFERENCE TO RELATED APPLICATIONS

This application claims priority to German Patent Application No. 102008004454.7-56 filed Jan. 15, 2008, which is incorporated herein by reference.

STATEMENT REGARDING FEDERALLY SPONSORED RESEARCH DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

I. Field of The Invention

The invention relates to an analog electronic angle sensor circuit with a ground connection and with a supply voltage connection and with an output, and the invention relates to a method for electronic emulation of an optimum potentiometer. Such angle sensor circuits are also designated as angle sensors with a ratiometric output signal.

II. Technical Background

In the prior art, precision potentiometers are used in voltage divider circuits for measuring angles. These circuits comprise an internal resistance, which depends on the set divider ratio. This leads to measurement errors, when connecting to follow on electronics with a finite input resistance (loaded voltage divider). Furthermore the service life of a potentiometer is reduced by loading the slider contact. Furthermore, potentiometers can be destroyed by inverse polarity connection, since the safety circuits, which are otherwise typical for current- and/or voltage limitation, can lead to additional falsifications of the output signal.

SUMMARY OF THE INVENTION

Based on this state of the art it is the object of the present invention to find an electronic replacement for conventional potentiometers which does not comprise the above mentioned disadvantages (measurement errors due to internal resistance, limited service life due to mechanical wear of slider contacts, possible destruction through inverse polarity connection). Accordingly it is also an object of the present invention to provide a method for electronically emulating an optimum potentiometer, which method also avoids the disadvantages described supra.

The object is achieved by an analog angle sensor circuit with a ground connection and a supply voltage connection and an output, which angle sensor circuit comprises an actual sensor and a suitable sensor circuit, wherein the voltage at the output relative to ground is proportional to the product of the supply voltage and the measured angle. The object is also accomplished by a method for electronic emulation of an optimum potentiometer, in which the input voltage is reduced to a fixed fraction and an analog touch free angle sensor is operated with said fraction of the input voltage as an operating voltage, wherein the output voltage of said angle sensor is proportional to the operating voltage and to the rotation $\phi$ measured by the angle sensor.

BRIEF DESCRIPTION OF THE DRAWINGS

An embodiment of the present invention is subsequently described in more detail with reference to the appended circuit diagrams.

DETAILED DESCRIPTION OF THE INVENTION

Figure 1:
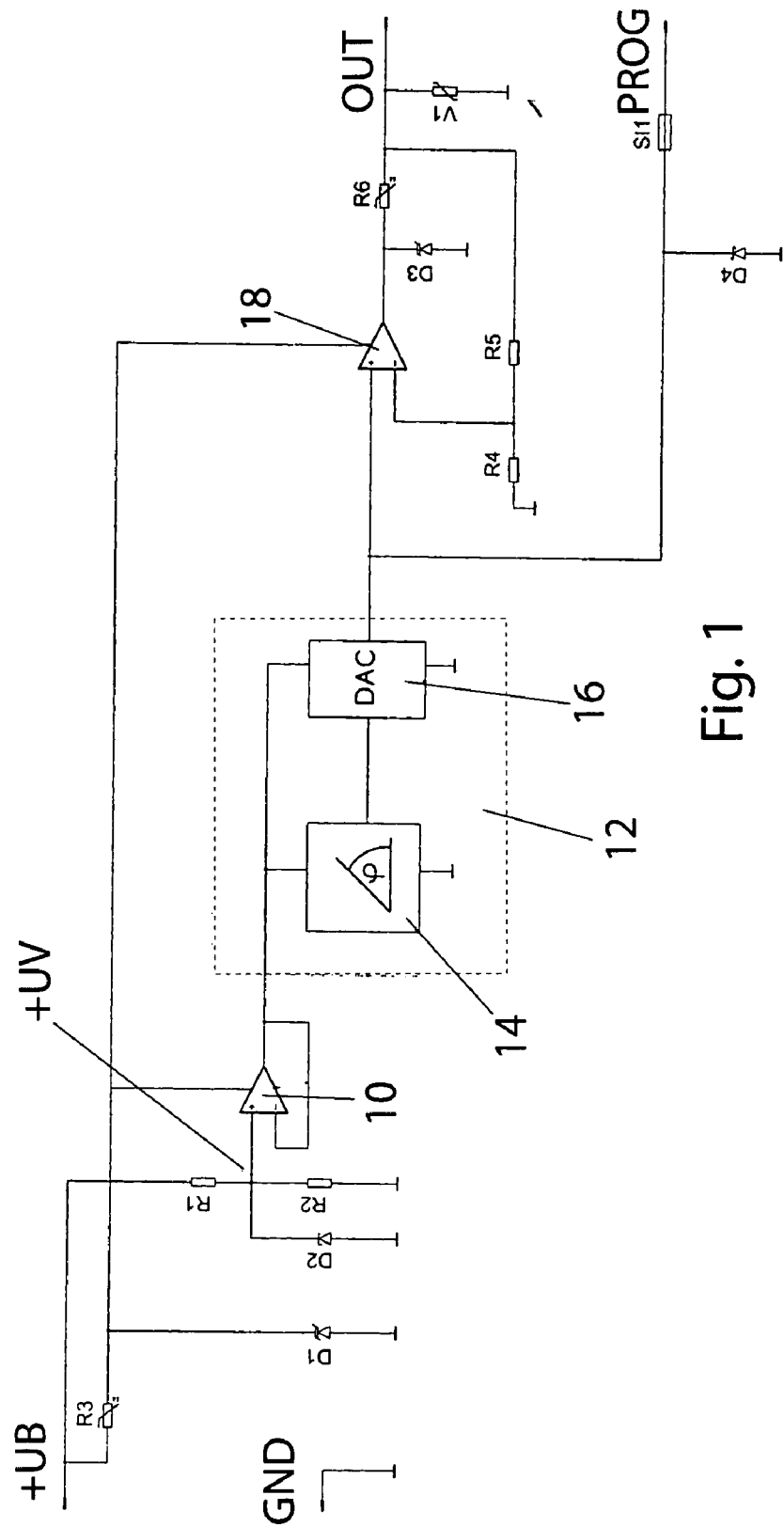
FIG. 1 shows a block diagram of a ratiometric angle sensor according to the invention.

FIG. 1 shows a simplified block diagram of a ratiometric angle sensor according to the invention, in which substantially only those elements are depicted which are essential for the particular function, and circuit elements which are only used for voltage supply, for voltage stabilization and for protecting the inputs against overvoltage or against inverse polarity are mostly omitted.

As illustrated in FIG. 1, the illustrated ratiometric angle sensor according to the invention is supplied with a supply voltage +UB relative to ground (GND) of 9 V to 11 V. The supply voltage +UB is reduced to 4.5 to 5.5 V by the voltage divider which is formed by the resistors R1 and R2. For this purpose the one connection of the resistor R1 is connected with +UB, the other connection of R1 is connected with R2 its remaining free connection is connected to ground (GND).

As a protection against overload and/or inverse polarity a Zener diode D2 is connected in parallel with R2. The supply voltage, which is reduced to half, is then obtained between the resistors R1 and R2. In this case the following holds for the resistance values: R1=R2, so that the following holds in this particular case: +UV=½ (+UB).

In order to be able to keep +UV very precisely constant and independent from load variations, +UV is stabilized by the once back fed operational amplifier 10. The output of the operational amplifier 10 which also carries +UV, but in a wide range independent from the load though the stabilization by the operational amplifier 10 is then used as supply voltage for an analog angle sensor 12. This analog angle sensor 12 can be a digital angle sensor 14 in combination with a digital-analog converter 16, as depicted herein, or also e.g. a magnetic angle sensor using the HALL-effect as described e.g. in the German utility model document DE 20 2007 006 955 U1.

Suitable digital angle sensors 14 are known in the prior art.

The analog angle sensor 12 thus supplies an output signal which is proportional to the measured angle $\phi$ and to the supply voltage +UV with which the sensor 12 is supplied itself. In order to thus stabilize the output signal of the sensor 12 against load variations at the output OUT of the circuit according to the invention, an additional operational amplifier 18 is provided. However when an operation amplifier 18 is already provided here, it can also be connected, so that it simultaneously amplifies the output signal of the sensor 12, which is disposed between 0 and 5.5 V, to a voltage range of 0 to 11 V. For this purpose the feed back of the output signal to the operational amplifier only has to be performed through another voltage divider R4 and R5. In order for the output signal to cover the entire range from 0 to 11 V again, the resistors R4 and R5 are preferably selected, so that the operational amplifier 18 has an amplification which corresponds to the inverse of the reduction of the voltage +UB through the voltage divider R1 and R2, in the present case so that R4=R5.

An even better decoupling of the output voltage OUT from variations of the loads at the output OUT is accomplished when the feed back branch of the operational amplifier 18, thus the connection of the resistor R5 is only connected after safety connecting the output against overload and inverse polarity (resistor R6 and Zener diode D3). A voltage drop over R6, which is a function of the load at the output OUT, is then compensated by the operational amplifier 18.

The output OUT continues to be connected to ground through a voltage limiting element V1 in order to assure the required overvoltage safety. The load at the output through the element V1 is thus also compensated by the readjustment of the operational amplifier 18.

The full operating voltage +UB is used as a supply voltage for the operational amplifiers 10 and 18 as opposed to supplying the actual sensor 12 with a reduced voltage. The required inverse polarity protection and overload protection are provided by the current limiting impedance (self resetting safety PTC) R3 and by the Zener diode D1.

The voltage divider formed by the resistors R1 and R2 can be directly connected to +UB, since the load at the output of said voltage divider between the resistors R1 and R2 through the operational amplifier 10 is so small, that resistance values in the range of 100 kΩ can be selected for the resistors R1 and R2. Thus, the currents, maximally occurring herein are limited, so that damages to the operational amplifier 10 can be excluded. The inverse polarity protection is assured by the Diode D2.

In the same manner a detrimental effect of a wrong connection of the of the output OUT upon the operational amplifier 18 can be avoided by selecting the resistors of the voltage divider R4 and R5 also very high, in the range of approximately 100 kΩ.

Eventually, programmability can be provided for the present circuit by controlling the output of the sensor element 12 directly through a programming conductor PROG. The programming conductor PROG can thus be configured interruptible as described in a co-pending patent application of the present applicant by running the connection PROG directly through a safety element SI1 and by providing a diode D4 behind said safety element, which diode blocks during normal operation. Through polarity inversion of the connection PROG a tripping of the safety element SI1, and thus an interruption of said programming path can be forced. Thus, a voltage drop occurs at the diode D4, which is at the most its operating voltage in pass through direction, thus typically approximately 0.7 V. A voltage that small with inverse polarity does not have any detrimental effect upon the electronic components 16 and 18.

Figure 2:
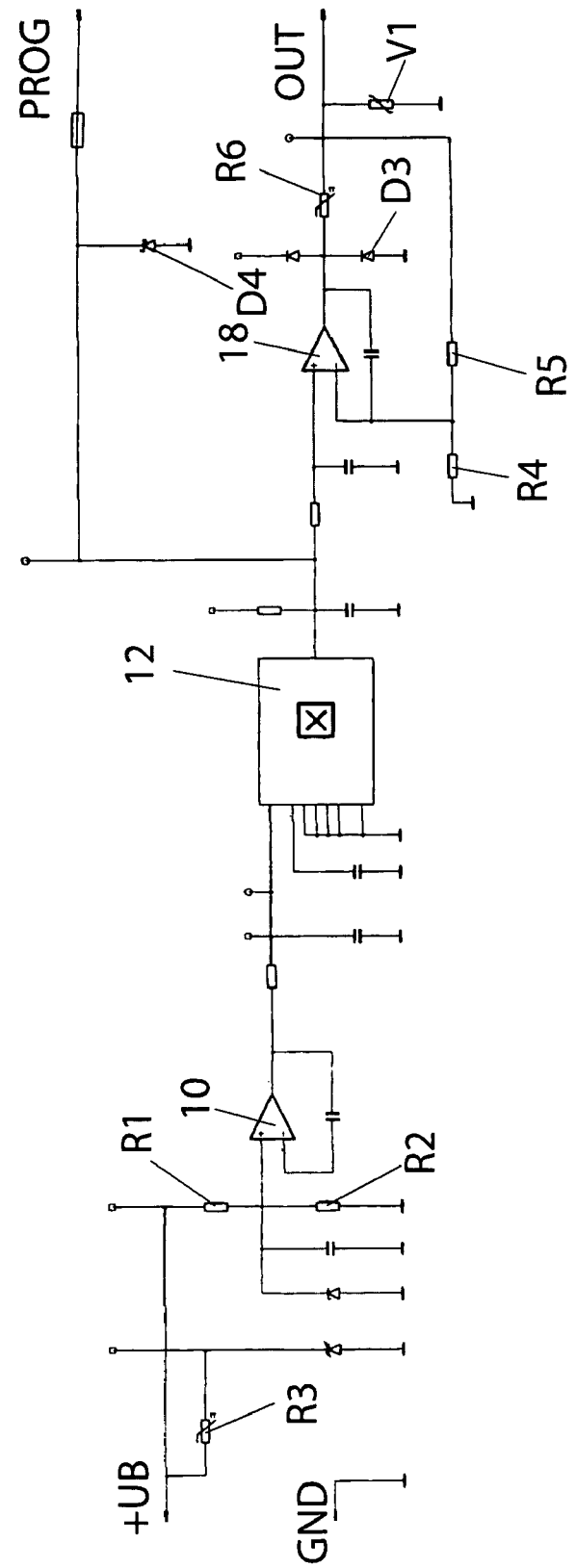
FIG. 2 shows a detailed circuit diagram of the angle sensor according to FIG. 1.

FIG. 2 shows a similar ratiometric angle sensor according to the invention, thus, however, for operation with an operating voltage between 7.5 V and 9 V. This is a much more detailed illustration in which all circuit elements are depicted, not only those circuit elements which are required to operate the circuit in principle. Furthermore a single HALL-angle sensor 12 is provided instead of the combination of a digital angle sensor 14 and a digital-analog converter according to FIG. 1.

The adaptation to the different operating voltage is performed in the present case by setting the attenuation factor not to ½, but to 0.65, though the resistance value of the resistor R2 is also selected at 100 kΩ, but the resistance value of the resistor R1 is only 64.9 kΩ. Accordingly, then also the resistance R5 has to be selected at 64.9 kΩ, while R4 remains at 100 kΩ. Thus it is assured that the attenuation through the voltage divider R1 and R2 is inversely proportional to the amplification forced by providing the operational amplifier in the return path with the voltage divider R4 and R5. Thus it should always hold: R1/R2=R5/R4, or in the present case even R1=R5 and R2=R4. FIG. 2 thus also shows how the circuit can be adjusted to different ranges of the operating voltage +UB by selecting the resistors R1, R2, R4 and R5 accordingly, wherein the operating voltage of the actual sensor element 12 always remains at 5V±10%.

Thus, the present circuit provides a magnetic angle sensor with a sensor element and with a position encoder magnet (the latter is not depicted) for function- and connection compatible replacement of potentiometers for the first time. Accordingly, the signal output of the circuit according to the invention provides a signal voltage which is proportional to the supply voltage. This is designated as ratiometric behavior or voltage divider behavior. Thus, the output signal OUT in an angle measuring range Φ to be defined is proportional to the supply voltage +UB and proportional to the measured angle φ and the following applies:

$$U_{out} = +UB \times \phi/\Phi$$

In particular, the signal ranges of the angle sensor 12 and the output signal range of the output OUT are not set to the full range over the entire supply voltage, but preferably to 10% to 90% of the supply voltage. This is accomplished by the output signal range of the angle sensor 12 being defined by programming as preferably 10.90%.

In another embodiment in particular the angular measurement range of the angle sensor 12 is defined by programming as any partial angle, which is less than 360°, e.g. 0.90°. In spite of that, the output voltage range of the angle sensor 12 is used in its entirety through the programmed scaling, so that the full signal range of 10% to 90% is also available at the output of the sensor circuit. This is an advantage compared to measuring partial angles with standard potentiometers. With standard potentiometers analyzing partial angles at full signal range is only possible through configuring partial circle resistor paths.

Contrary to the "classic" prior art potentiometers, the internal resistance of the signal output according to the invention is constant and independent from the value of the signal voltage which is put out. Furthermore, the internal resistance of the signal output is by orders of magnitude lower through the driver-operational amplifier 18, than in a classic potentiometer.

Through the input voltage divider R1 and R2 with an attenuation factor of K<1 (in FIG. 1: K=0.5, in FIG. 2 K=0.65) an internal operating voltage UV is generated for the sensor 12. Its output signal OUT1 is then supplied to an output operational amplifier 18, whose amplification factor is adjusted to 1/K through providing the feedback path with voltage divider comprised of R4 and R5. Said voltage divider then generates an output signal $U_{out}$, which follows the formula provided supra and which is extremely stable with respect to loads, since it comprises a very low constant internal resistance as described supra. Partial angles of 360°, like e.g. 90° or 180° can be specified as a measuring range Φ. The internal supply voltage UV for the sensor 12 is preferably set at 5V. Since the sensors 12 based on HALL- or MR-sensor technology do not have a dead range, the angle sensor according to the invention can be used seamlessly over the full measuring range of 360°.

The mechanical measuring range and the output value of prior art potentiometers are rigidly coupled with one another, so that also the output voltage range and thus the measurement precision are reduced when measuring over mechanical partial angles. In order to circumvent this when measuring partial angles with prior art potentiometers, also the resistor path has to be provided in partial circle geometry. In the angle sensor according to the invention mechanical partial angles are scaled by programming the angle sensor 12, so that the output signal still uses the full output range. The operational amplifier 18 is preferably an operational amplifier with rail to rail output, so that the output voltage range can almost reach the full range of the supply voltage +UB.

In the described embodiments according to the invention the permissible operating range, in which the output voltage is proportional to the connected supply voltage, is disposed at ±10% of the nominal supply voltage. The nominal supply voltage itself can be adjusted in a range of 7 V to 40 V, wherein a voltage range of 7 V to 16 V is preferred.

As a sensor element, either a digital angle encoder and a digital analog converter can be selected as illustrated in FIG. 1, on the other hand a HALL- or GMR-sensor can also be used.

According to the invention the sensor element 12 is always supplied with a uniform supply voltage $U_v$ in the range of 5 V±10%, which is proportional to the input voltage +UB, which may also vary by ±10%. The circuit according to the invention functions as follows:

An attenuation stage R1, R2, 10 is connected in front of the sensor element 12 and an amplifier stage R4, R5, 18 with an amplification factor which is inverse thereto is connected behind the sensor element. The connected supply voltage +UB is first divided by a factor K (K<1) and said partial voltage +UV is buffered by the operational amplifier 10 and used as a reference voltage for the operation of the sensor element 12. On the other hand, the internal operating voltage for the supply voltage of the operational amplifiers 10 and 18 is derived from the supply voltage +UB through the safety circuit R3, D1. The variations of the supply voltage in the range of ±10% thus form as variations of the internal supply voltage of the sensor element 12, or at least of the digital-analog converter 16 which is connected after a digital sensor element 14. The angle-proportional output voltage range thus ranges from 10% to 90% of the supply voltage +UB.

Thus, the circuit according to the invention is an excellent connection compatible replacement for classic prior art potentiometers.

The required inverse polarity protection is accomplished by providing output impedances (R3, R6) in the supply path and in the signal path, which output impedances have a current- and/or voltage limiting effect in the case of an inverse polarity connection. A current limiting impedance R3 (a self resetting PTC safety) is inserted in the supply path. A high resistance resistor R1 and a Zener Diode D2 are inserted as voltage limiting elements into the measurement path for the supply voltage to the input of the operational amplifier 10. A current limiting element (R6) and also a voltage limiting element (V1 and D3) are inserted into the signal output.

The measurement range can be programmed to partial angular ranges, so that the entire signal range is used.

The supply voltage range can be adapted to typical potentiometer supply voltages of e.g. 8 V or 12 V by defining the voltage divider R1, R2 and the output amplification through the voltage divider R4/R5 in the feedback loop of the operational amplifier 18.

Also this ratiometric angle sensor according to the invention can be configured irreversibly programmable according to technical teachings which can be derived from the co-pending patent application of the present applicant.

The present invention has the following advantages:

The ratiometric angle sensor according to the invention has a constant internal resistance, which is independent from the value of the output signal. Loading the output signal with connected load impedances is possible in a wide range (0 to 10 mA). The circuit according to the invention facilitates integrating load- and/or current limiting elements as a protection against inverted connections or excessive voltages from the outside without falsifying the output signal. The measurement range can be programmed for partial angular ranges. Through the adaptation to the supply voltages between 7 V and 15 V, which are typical for potentiometers, the circuit according to the invention can be used as a connection compatible and advantageous replacement for potentiometers.

The mechanical angular measurement range can be seamlessly programmed to 360° with a defined transition location from 360° to 0°. The mechanical measurement range can also be programmed for partial angles, wherein the output signal can be scaled to the full output range.

The voltage divider is e.g. an electronic potentiometer with a permanent memory, or it is a silicone voltage divider element which can be trimmed by current impulses. Said voltage divider is connected to a programming unit by conductors and it is programmed for a particular divider ratio after the component is manufactured and before final assembly.

REFERENCE NUMERALS AND DESIGNATIONS

10 Operational Amplifier for UV
12 Angle Sensor
14 Digital Angle Sensor
16 Digital Analog Convertor
18 Operational Amplifier for Output
GND Ground
OUT Output Signal
PROG Programming Input
R1, R2 Input Voltage Divider
R4, R5 Voltage Divider for adjusting the Amplification of 18
R3, R6 Safety Resistors against Overload
D1, D2, D3 Overload- and Inverse Polarity Safety Diodes
D4 Diode for irreversible Interruption of Programming Conductor
SI1 Safety Element for irreversible Interruption of Programming Conductor
V1 Output Safety Impedance
UB Operating voltage of Circuit
UV Reduced Operating Voltage for Sensor

The invention claimed is:

1. A method for electronic emulation of an optimum potentiometer wherein a variable input voltage (+UB) is reduced to a fixed fraction (1/k) and an analog angle sensor (12) is operated with this fraction of the input voltage (+UB) as an operating voltage ($U_v$), wherein the output voltage (OUT1) of said angle sensor is proportional to the operating voltage and to a rotation angle (φ) measured by said angle sensor (12); and
 the output voltage (OUT1) of the angle sensor (12) is amplified by an additional operational amplifier (18) by the inverse (k) of the fraction (1/k) and put out as output signal (OUT) only thereafter.

2. A method according to claim 1, wherein the input voltage (+UB) is reduced to the fraction (1/k) by means of a suitable voltage divider (R1, R2).

3. A method according to claim 1, wherein the reduced voltage (UV) is buffered by a subsequently connected operational amplifier (10) with an amplification of 1.

4. A method according to claim 1, wherein the angle sensor (12) is programmed, so that it provides and output signal which covers the entire output signal range when the angle varies over a partial angular range.

5. An analog electronic angle sensor circuit with a ground connection (GND) and with a supply voltage connection (+UB) and with an output (OUT), comprising:
an actual sensor (12) and a suitable wiring of said sensor (12), wherein the voltage at the output (OUT) relative to ground is proportional to the product of a supply voltage (+UB) and a measured angle ($\phi$);
wherein the actual sensor (12) is provided with a particular supply voltage (UV) which is a constant fraction (1/k) of the supply voltage (+UB) of the analog electronic angle sensor circuit; and
wherein the supply voltage connection of the actual sensor (12) is connected with the supply voltage (+UB) of the analog electronic angle sensor circuit through a resistor (R1) and connected to ground through an additional resistor (R2) and thus the voltage divider formed by the resistors (R1, R2) determines the constant fraction (1/k) of the supply voltage (+UB), which constant fraction is provided to the actual sensor (12).

6. An analog electronic angle sensor circuit according to claim 5, wherein a signal output of the actual sensor (12) is connected to the output (OUT) of the angle sensor circuit through a driver circuit (18, R4, R5), so that the internal resistance of the output (OUT) is constant and independent from the value of the signal voltage which is put out.

7. An analog electronic angle sensor circuit according to claim 6, wherein the driver circuit (18, R4, R5) comprises an operational amplifier which is wired with resistors (R4, R5) in a suitable manner.

8. An analog electronic angle sensor circuit according to claim 5, wherein the actual sensor (12) is provided with a particular supply voltage (UV) which is a constant fraction (1/k) of the supply voltage (+UB) of the analog electronic angle sensor circuit.

9. An analog electronic angle sensor circuit according to claim 5, wherein an operational amplifier (10) is connected as a driver between the voltage divider formed by the resistors (R1, R2) and the supply voltage connection of the actual angle sensor (12).

10. An analog electronic angle sensor circuit according to claim 9, wherein the driver circuit (18) comprises an amplification k at the output (OUT), which amplification is the inverse of the fraction (1/k) of the supply voltage, which fraction is defined by the voltage divider formed by the resistors (R1, R2).

11. An analog electronic angle sensor circuit according to claim 5, wherein the driver circuit (18) comprises an amplification k at the output (OUT), which amplification is the inverse of the fraction (1/k) of the supply voltage, which fraction is defined by the voltage divider formed by the resistors (R1, R2).

12. An analog electronic angle sensor circuit according to claim 5, wherein the angle sensor (12) is programmable, so that the output variable varies over the full output signal range, when the angle varies only over a partial angular range.

13. An analog electronic angle sensor circuit according to claim 5, wherein the angle sensor (12) is programmable, so that the output voltage (OUT) is proportional to the operating voltage and proportional to the partial rotation angle ($\phi$)<360°.

14. An analog electronic angle sensor circuit according to claim 5, wherein the output voltage range comprises 10% to 90% of the supply voltage.

15. An analog electronic angle sensor circuit according to claim 5, wherein the voltage dividers R1, R2 and R4, R5 are programmable voltage dividers which can be adjusted to a particular ratio through programming conductors.

16. An analog electronic angle sensor circuit according to claim 5, wherein the output voltage (OUT1) of the angle sensor (12) is amplified by an additional operational amplifier (18) by the inverse (k) of the fraction (1/k) and put out as output signal (OUT) only thereafter.

* * * * *